United States Patent
Scott (10) Patent No.: US 12,503,256 B2
(45) Date of Patent: Dec. 23, 2025

(54) AUTONOMOUS DOCKING SYSTEM FOR AN UNMANNED AERIAL VEHICLE

(71) Applicant: TB2 Aerospace, Breckenridge, CO (US)

(72) Inventor: Frank M. Scott, Breckenridge, CO (US)

(73) Assignee: TB2 Aerospace, Breckenridge, CO (US)

( * ) Notice: Subject to any disclaimer, the term of this patent is extended or adjusted under 35 U.S.C. 154(b) by 0 days.

(21) Appl. No.: 18/206,541

(22) Filed: Jun. 6, 2023

(65) Prior Publication Data

US 2023/0312145 A1    Oct. 5, 2023

Related U.S. Application Data

(63) Continuation-in-part of application No. 18/048,013, filed on Oct. 19, 2022, now abandoned.

(60) Provisional application No. 63/257,348, filed on Oct. 19, 2021.

(51) Int. Cl.
*B64U 70/92* (2023.01)
*B64D 1/22* (2006.01)
*B64U 101/66* (2023.01)

(52) U.S. Cl.
CPC .............. *B64U 70/92* (2023.01); *B64D 1/22* (2013.01); *B64U 2101/66* (2023.01)

(58) Field of Classification Search
CPC ...... B64D 1/22; B64U 2101/66; B64U 70/92; B64U 70/97
See application file for complete search history.

(56) References Cited

U.S. PATENT DOCUMENTS

| | | | |
|---|---|---|---|
| 2017/0015415 A1* | 1/2017 | Chan | G06Q 30/04 |
| 2018/0072415 A1* | 3/2018 | Cantrell | B64C 39/024 |
| 2019/0161190 A1* | 5/2019 | Gil | E05F 15/77 |
| 2019/0229462 A1* | 7/2019 | Hodgson | B64U 30/20 |
| 2019/0359332 A1* | 11/2019 | Shannon | B66F 19/00 |
| 2020/0031438 A1* | 1/2020 | Moses | G01S 5/0231 |
| 2020/0324934 A1* | 10/2020 | Weekes | B64C 7/00 |
| 2021/0039783 A1* | 2/2021 | Weekes | B64D 1/10 |
| 2021/0039785 A1* | 2/2021 | Costanzo | B64U 10/14 |

* cited by examiner

*Primary Examiner* — Joshua D Huson
*Assistant Examiner* — Shanna Danielle Glover
(74) *Attorney, Agent, or Firm* — James A. Sheridan; Sheridan Law, LLC (57) ABSTRACT

There is disclosed an autonomous docking system for aerial delivery of a payload from a ground station. The system may comprise an unmanned aerial vehicle (UAV) having one or more motors for powered flight and a pyramidal bottom surface opening downward to terminate in a base perimeter. A cargo pod may be included to carry the payload and may have a pyramidal top surface complementary to the pyramidal bottom surface of the UAV. The system may further include a latching system for locking the UAV to the cargo pod and one or more steering components for approaching the cargo to within a steering accuracy. The UAV may be configured to dock by steering downward until the base perimeter slidably contacts the pyramidal top surface of the cargo pod for gravity-aligning the UAV in azimuth and laterally. The system may be further defined by a capture radius of the base perimeter being greater than a lateral component of the steering accuracy.

16 Claims, 9 Drawing Sheets

AUTONOMOUS DOCKING SYSTEM FOR AN UNMANNED AERIAL VEHICLE

CROSS REFERENCE TO RELATED APPLICATIONS

This patent application claims priority to U.S. Provisional Application No. 63/257,348 filed on Oct. 19, 2021, entitled "UAS/UGS Electro-mechanical Alignment and Capture System", and U.S. Non-provisional application Ser. No. 18/048,013 filed on Oct. 19, 2022, entitled "UNMANNED AERIAL/GROUND SYSTEM CARGO ALIGNMENT AND CAPTURE SYSTEM". The entire contents of Applications 63/257,348 and Ser. No. 18/048,013 being expressly incorporated by reference herein.

BACKGROUND

Advancing technologies now enable an unmanned aerial vehicle (UAV) to autonomously release a payload (package) at a customer location within a service area of a dispatching warehouse, then return to the warehouse on a remaining battery charge. An itinerary of an aerial delivery system, centralized at the warehouse, may direct and coordinate flight plans for multiple UAVs over the service area. However, human intervention is required to align and secure the customer payload to the UAV because of limited steering accuracies of the UAV; therefore the UAV may not be able to capture a different payload while in the field. Also, the service area and a weight of the payload may be constrained by how much battery charge must be reserved for the return flight.

In certain scenarios, the UAV may deliver and park a heavier payload at a field location closer to the warehouse, leaving substantial battery reserve for the return flight; the UAV may then wait for customer retrieval. Unfortunately, the parked UAV or its payload may be stolen if unattended. Also, once the payload is safely retrieved by the customer, the UAV return flight may be dedicated to returning only one empty carrier used to house the payload, thus underutilizing the battery reserve. Regrettably, single-carrier returns to the warehouse may require a larger fleet of UAV's to operate the delivery system. Solving these limitations in the prior art is further complicated by a lack of standardization in the UAV and carriage design.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is disclosed an autonomous docking system for unmanned aerial delivery of a payload from a ground station. The system may comprise an unmanned aerial vehicle (UAV) having one or more motors for powered flight, and may include a pyramidal bottom surface opening downward to terminate in a base perimeter. The system may further comprise a cargo pod configured to carry the payload and which may have a pyramidal top surface complementary to the pyramidal bottom surface of the UAV. A latching system may be included for locking the UAV to the cargo pod when docked.

The system may further comprise one or more steering components disposable on the UAV for approaching the cargo pod at the ground station to within a steering accuracy. The UAV may be configured to dock by steering downward until the base perimeter slidably contacts the pyramidal top surface of the cargo pod for gravity-aligning the UAV in azimuth and laterally. The system may be further defined by a capture radius of the base perimeter being greater than a lateral component of the steering accuracy.

In another embodiment, there is disclosed an autonomous docking system for securely storing a payload deliverable by an unmanned aerial vehicle (UAV) having a battery for powered flight. The docking system may comprise a cargo pod for carrying the payload and hoistable by the UAV. The cargo pod may include a pyramidal bottom surface opening downward to terminate in a base perimeter. A docking station may be securable to a ground location and may have a pyramidal top surface complementary to the pyramidal bottom surface of the cargo pod. A latching system may be included for locking the cargo pod to the docking station.

The system may include one or more steering components on the UAV for approaching the docking station to within a steering accuracy. The hoisted cargo pod may be configured to dock by steering the UAV downward until the base perimeter of the cargo pod slidably contacts the pyramidal top surface of the docking station for gravity-aligning the cargo pod in azimuth and laterally. The system may be defined by a capture radius of the base perimeter being greater than a lateral component of the steering accuracy.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 5 and 9 each illustrates a perspective view of a pyramidal top surface, in which

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

When elements are referred to as being "connected" or "coupled," the elements can be directly connected or coupled together or one or more intervening elements may also be present. In contrast, when elements are referred to as being "directly connected" or "directly coupled," there are no intervening elements present.

As may be appreciated, based on the disclosure, there exists a need in the art for an aerial delivery system whose aerial vehicles can autonomously align with and capture a package within a service area of the delivery system. Additionally, there exists a need in the art for powering or refueling the vehicle in the field (service area). Further, there exists a need in the art for locking the package to a secure ground location in order to prevent theft of the package. Also, there exists a need in the art to maximally utilize the available fuel during the return flight so as to minimize the number of flights required each day. Finally, there exists a need in the art for adapting multiple non-standard vehicle designs to a standardized docking system.

Figure 6:
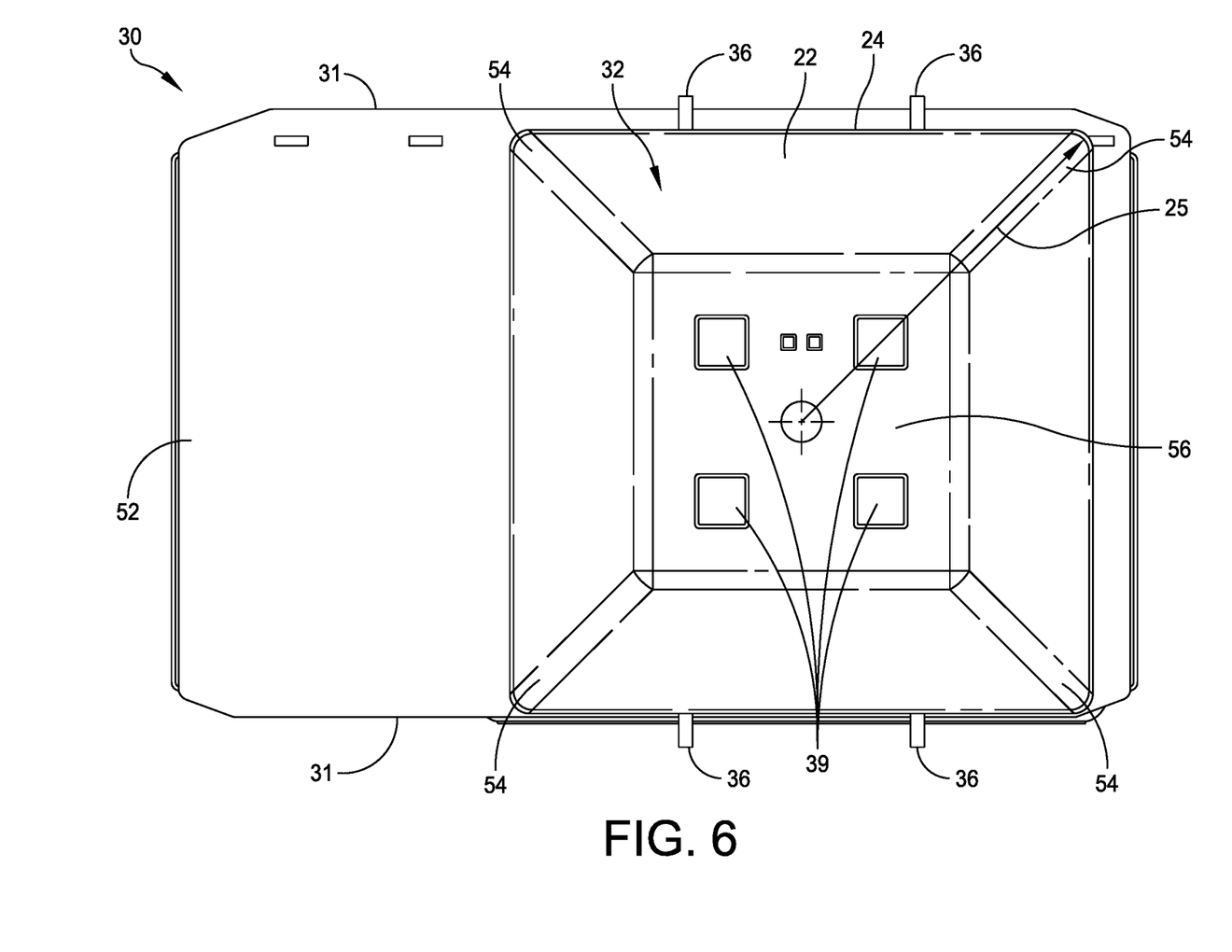
FIG. 6 illustrates a top view of the cargo pod for an autonomous docking system for an unmanned aerial vehicle, in accordance with an embodiment of the present disclosure.

Referring to FIGS. 1-8, in an embodiment, an autonomous docking system 10 is described for unmanned aerial delivery of a payload 14 (FIG. 8) from a ground station (not shown). The docking system 10 may include an unmanned aerial vehicle (UAV) 20 (FIG. 3) having one or more motors 21 for powered flight and a pyramidal bottom surface 22 opening downward to terminate in a base perimeter 24 with a capture radius 25 (FIG. 6). The UAV 20 may include a 3-axis maneuvering system for maintaining a level attitude during hovering and flying, and may also include a main battery (not shown) for powering the one or more motors 21. An itinerary of the aerial delivery system, centralized at a warehouse, may direct and coordinate a flight plan for the UAV 20 (among a fleet of UAVs) across the service area.

Figure 1:
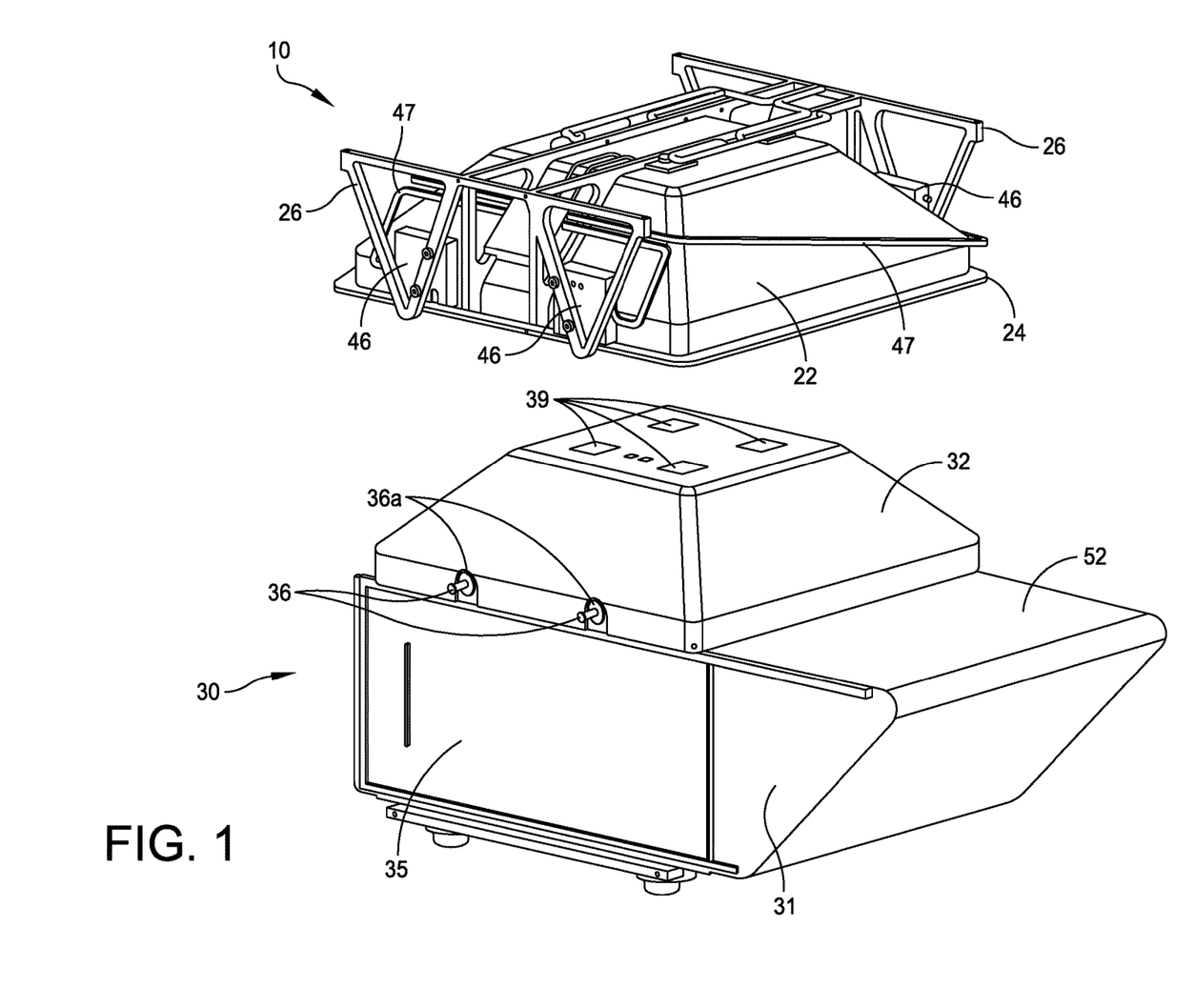
FIG. 1 illustrates a perspective view of mating components for an autonomous docking system for an unmanned aerial vehicle, in accordance with an embodiment of the present disclosure.
Figure 2:
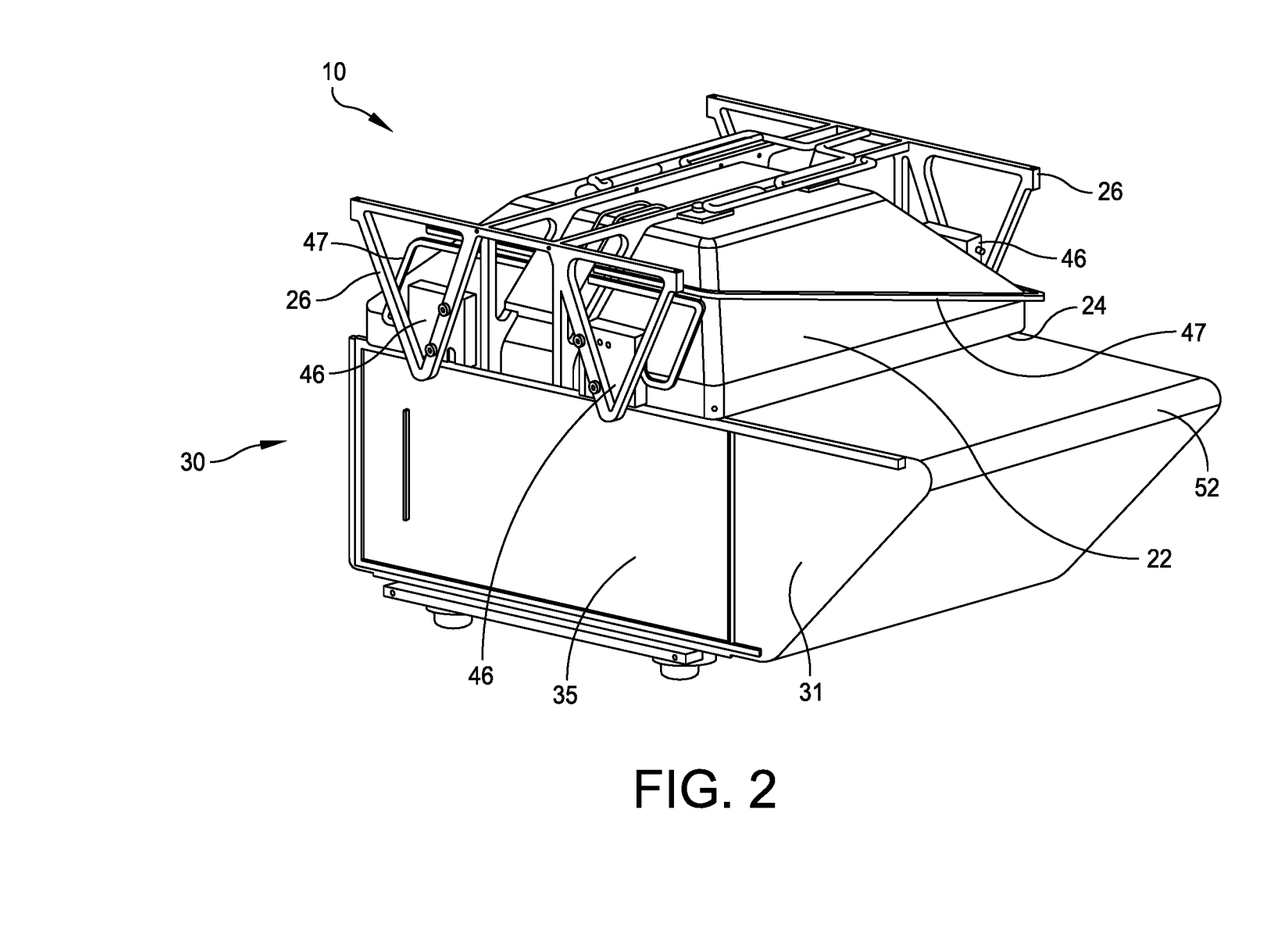
FIG. 2 illustrates a perspective view of the mated components for an autonomous docking system for an unmanned aerial vehicle, in accordance with an embodiment of the present disclosure.
Figure 3:
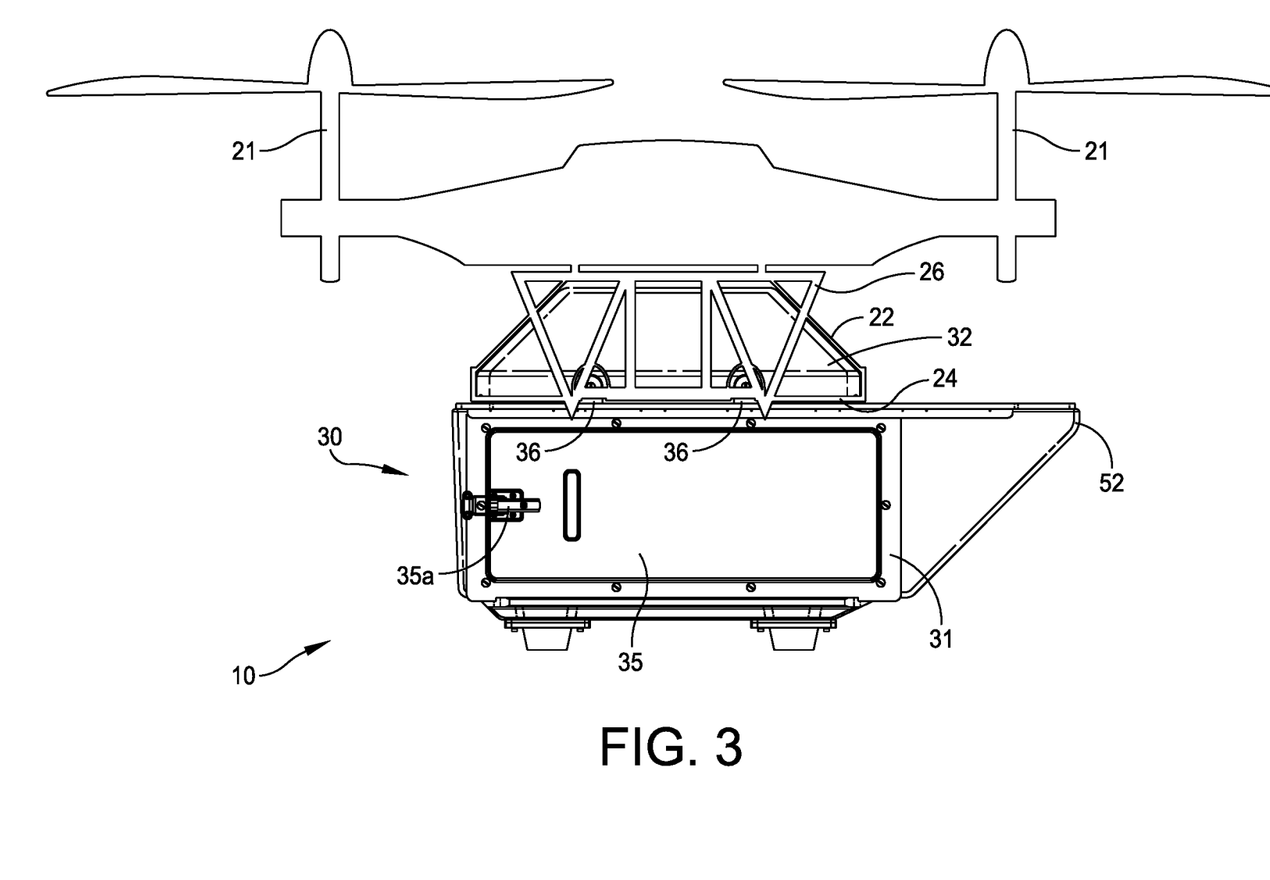
FIG. 3 illustrates a side view of a UAV with the mated components for an autonomous docking system for an unmanned aerial vehicle, in accordance with an embodiment of the present disclosure.
Figure 4:
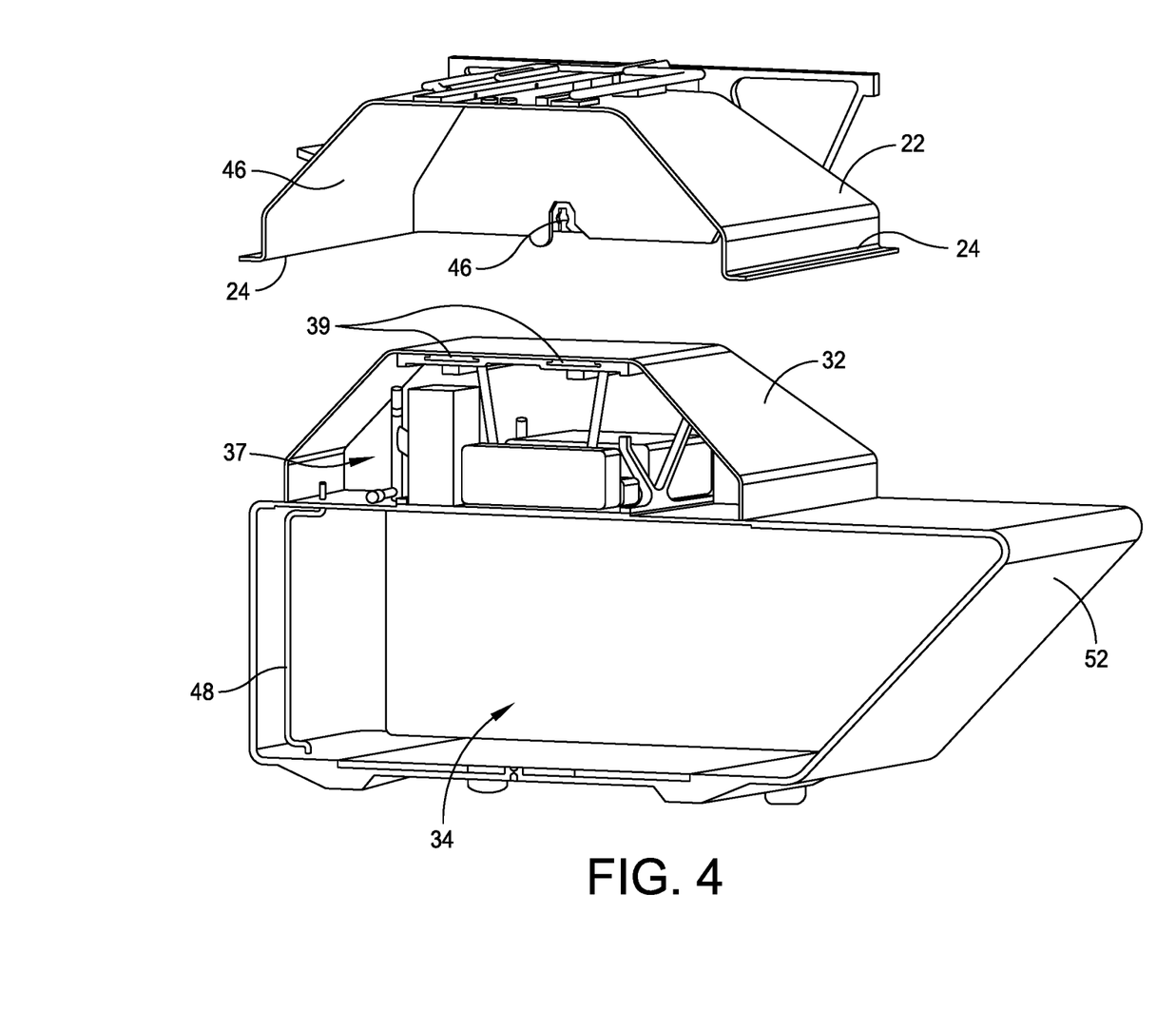
FIG. 4 illustrates a cutaway view of a cargo pod for an autonomous docking system for an unmanned aerial vehicle, in accordance with an embodiment of the present disclosure.
Figure 5:
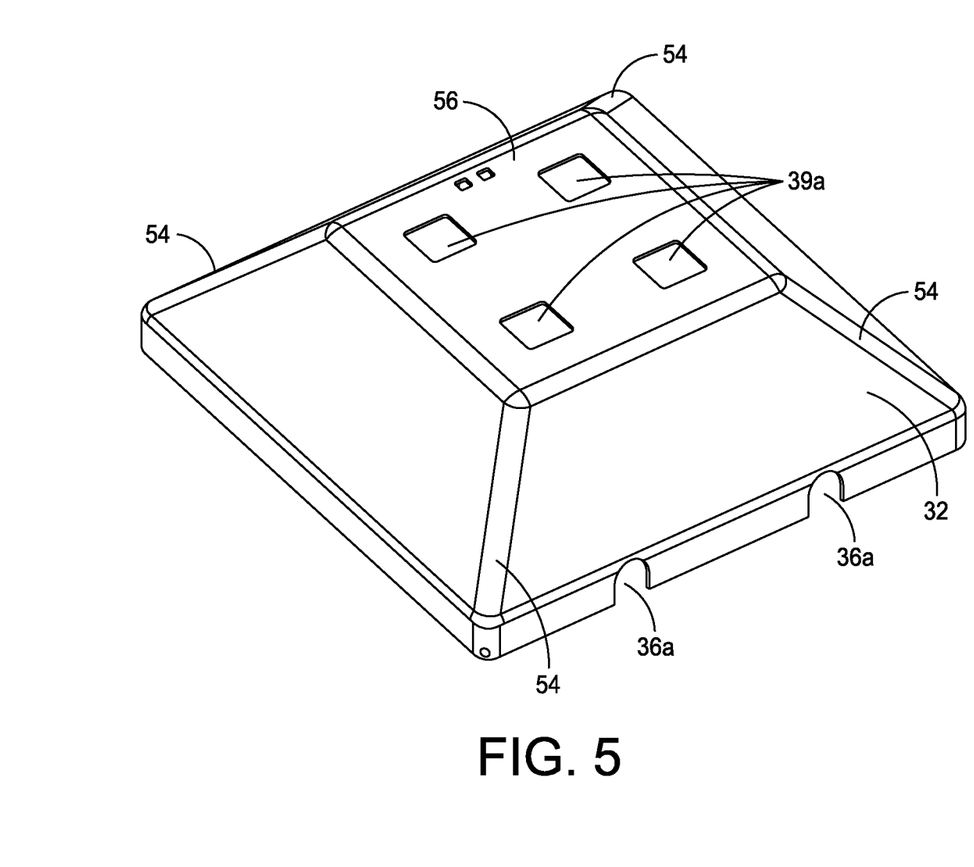
FIG. 5 illustrates the pyramidal top surface of the cargo pod for an autonomous docking system for an unmanned aerial vehicle, in accordance with an embodiment of the present disclosure.
Figure 7:
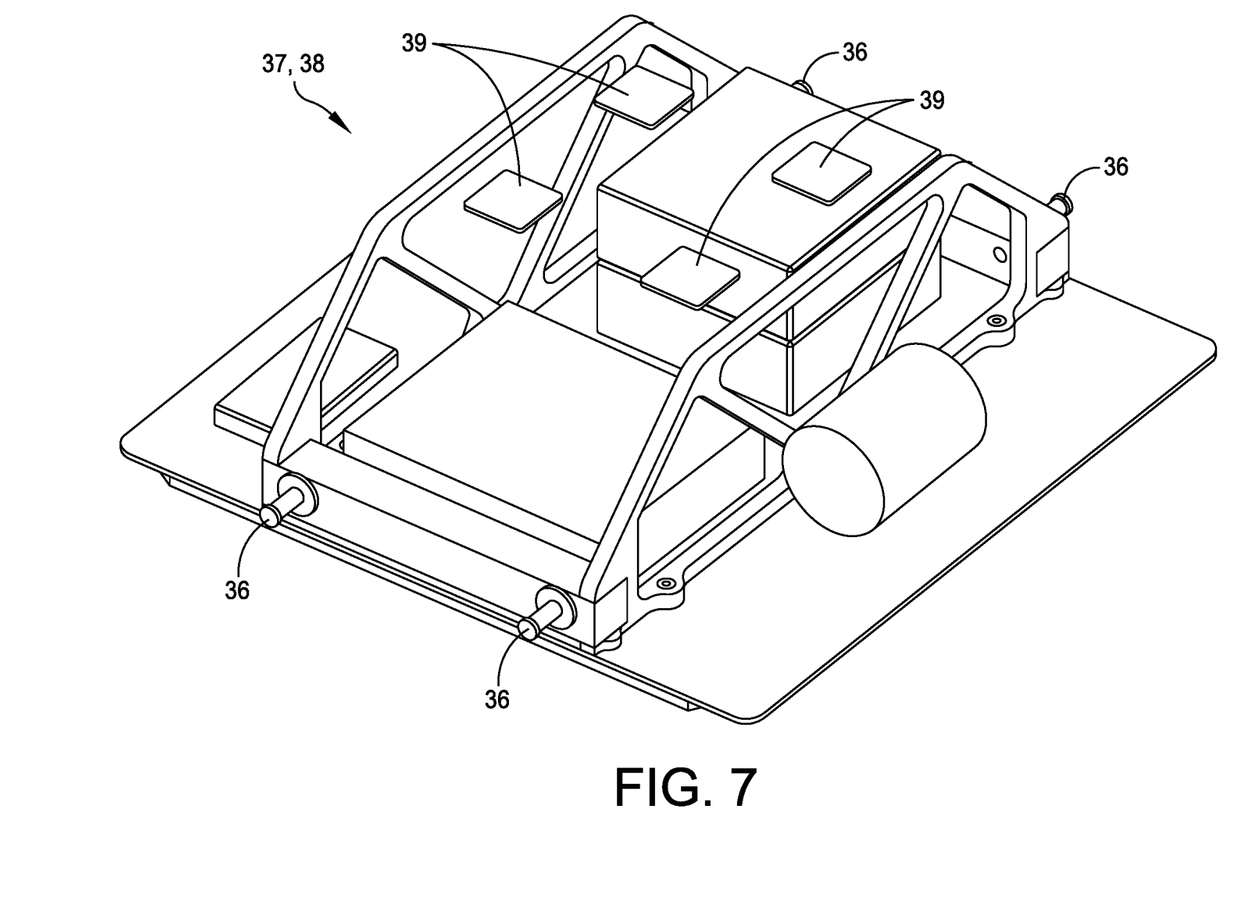
FIG. 7 illustrates a perspective view of internal components of the cargo pod for an autonomous docking system for an unmanned aerial vehicle, in accordance with an embodiment of the present disclosure.
Figure 8:
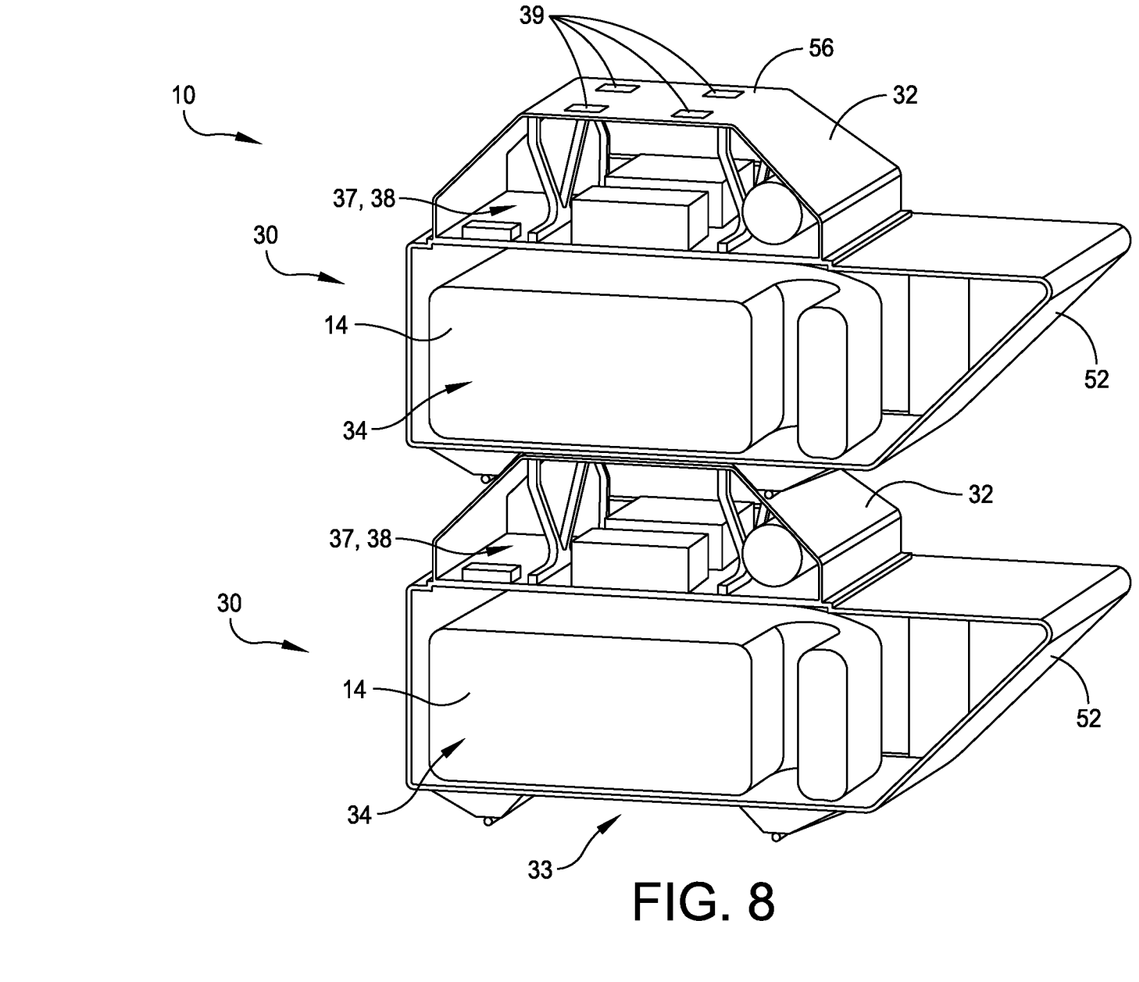
FIG. 8 illustrates a cutaway view of two stacked cargo pods for an autonomous docking system for an unmanned aerial vehicle, in accordance with an embodiment of the present disclosure.

Continuing with FIGS. 1-8, in various embodiments, the docking system 10 may include a cargo pod 30 configured to carry the payload 14. The cargo pod 30 may include a pyramidal top surface 32 complementary to the pyramidal bottom surface 22 of the UAV 20 for facilitating an alignment and capture of cargo pod 30 by UAV 20. The cargo pod 30 may house a cargo bay 34 lockable by an access door 35 for carrying and securing, respectively, payload 14. The access door 35 may include a locking means 35a, thereby discouraging theft (FIG. 3). The payload 14 may comprise one or more packages slated for delivery to one or more customers in the service area (FIG. 8). Aerodynamic front 52 of the pod 30 may reduce drag and/or generate lift when pointed in a direction of flight. The cargo pod 30 may include internal components 37 for coordinating with the UAV 20 and/or managing the payload 14 (FIGS. 4, 7, 8). For example, one of the components 37 may be an auxiliary battery 38.

Continuing with FIGS. 1-8, in various embodiments, both of the pyramidal surfaces 22 and 32 may identically be 3-sided, and may preferably be 4-sided. The top surface 32 may slope upward to form intersecting radial edges 54 (FIGS. 5-6) and may terminate at a flat central portion 56 substantially smaller than the base perimeter 24 of bottom surface 22. For example, the central portion 56 of the cargo pod 30 may be approximately half the size of the base perimeter 24 of the UAV 20.

Referring now to FIGS. 1-3 and 5-7, in various embodiments, the docking system may further comprise a latching system for automatically locking the UAV 20 to the cargo pod 30 when docked. The latching system may include one or more electro-mechanical or magnetic latches 46 (FIGS. 1-2) connectable to the UAV 20 and complementary latch receptacles 36 (FIGS. 1, 3, 6-7) disposed on the cargo pod 30. The latch system may engage once aligned contact has been made between UAV 20 and pod 30. Latch receptacle 36 may be a hard pin mounted to a side 31 of the cargo pod 30 and passing through receptacle opening 36a in the bottom surface 32. Latch 46 may electronically rotate to secure the hard pin 36 to the UAV 20. The latch 46 may also be an electro-permanent magnetic (EPM) device switchable in polarity by a temporary current.

Referring now to FIGS. 1-3, in various embodiments, a mating rack 26 may provide the pyramidal bottom surface 22 and be attachable to the UAV 20, where the UAV 20 may not itself be configured to provide the pyramidal bottom surface 22. Beneficially, the docking system 10 may thereby be adaptable to aerial vehicles not standardized to provide the bottom surface 22. In the embodiment of FIGS. 1-3, the rack 26 may be disposed with the one or more latches 46 of the latching system for securing the UAV 20 to complementary receptacles 36. In another embodiment, latches 46 may be disposed on or near the base perimeter 24 of the bottom pyramidal surface 22.

The docking system 10 may include a pyramidal bottom surface 22 (FIG. 5) separate from the rack 26 and UAV 10, the separate bottom surface 22 being directly fastenable to the rack 26 or to the UAV 20. In an embodiment not shown, the mating rack 26 may itself be formed to present aspects of the pyramidal bottom surface 22 critical to mating with pyramidal top surface 32, such as presenting the intersecting radial edges 54. Rack 26 may be made of metal, plastic, or other materials, and may also be referred to as the pod rack unit (PRU). Alternatively, the one or more latches 46 may be disposed on the cargo pod 30 and the complementary receptacles 36 may be disposed directly on the UAV 20 or on the mating rack 26.

Referring again to FIGS. 1-8, the autonomous docking system 10 may include one or more steering components (not shown) housed in the UAV 20 for approaching the cargo pod 30 at the ground station to within a steering accuracy. The steering components may include one or more of LIDAR, GPS, infrared, inertial, and photographic components for navigating the flight plan, approaching a customer location for delivery, and/or docking at the ground station. The UAV 20 may be configured to dock with the cargo pod 30 by steering downward until the base perimeter 24 slidably contacts the pyramidal top surface 32 of the cargo pod 30 for gravity-aligning the UAV 20 in azimuth and laterally.

A capture radius 25 of the base perimeter 24 may be greater than a lateral component of the steering accuracy for capturing the pod 30.

For example, during a docking maneuver, the UAV 20 may descend toward the cargo pod 30 until the base perimeter 24 of the bottom surface 22 contacts the intersecting radial edges 54 of the top surface 32, whereupon gravity may slidably rotate the UAV 20 'downhill' along the radial edges 54 to center the UAV 20 laterally and align it azimuthally. The 3-axis maneuvering system (not shown) may be configured to compensate for uneven slidable contact with the pyramidal top surface 32 in order to keep the UAV 20 level while allowing gravity descent. The docking system may include a docking sensor (not shown) to indicate correct alignment and mating and which may then enable the latching system. For example, the docking sensor may trigger a latch control line 47 to engage the latching system (FIGS. 1-2). The docking sensor may include any electrical, mechanical, or proximity means disposed on the UAV 20 or the pod 30 for indicating intimate contact therebetween.

Still with FIGS. 1-8, in various embodiments, the pyramidal bottom 32 and the top 22 surfaces may each be 4-sided and the steering accuracy may therefore have an azimuthal component of less than 45 degrees of error in order to reliably dock. Although the steering accuracy may be sufficient for identifying and navigating to a landing target placed at the customer location within a foot or several inches, this accuracy alone may not be adequate for reliably docking with the pod 30. Beneficially, configuring both the UAV 20 and the pod 30 with complementary pyramidal surfaces and the latching system may provide for an autonomous docking capability executable in the field without human intervention.

Referring to FIGS. 1-2, 4, and 7-8, the docking system 10 may include one or more power transfer contacts 39 on the pyramidal top surface 32 for sending power from the auxiliary battery 38 to the UAV 20 or its main battery while docked. The power contacts 39 may be spring-loaded copper pads disposed on the pyramidal top surface 32 of the cargo pod 30 and may be configured to electrically mate with complementary transfer contacts (not shown) on the UAV 20. In one embodiment, there may be four contacts 39 disposed on the top surface 32, as shown in FIGS. 1-2 and 6-8. Beneficially, providing the aerial delivery system with a capacity to dock with a cargo pod 30 in the field may provide an opportunity to autonomously refuel the UAV 20 for additional customer deliveries or for the return flight to the central warehouse.

Referring now to FIGS. 1, 3 and 8, in additional embodiments, the docking system 10 may further comprise a pod bottom surface 33 (FIG. 8) on the cargo pod 30 and which conforms to the pyramidal bottom surface 22 of the UAV for docking with and stacking onto another cargo pod. Another latching system may be included in system 10 for locking the two cargo pods 30 together for storage at the ground station. The ground station may be a docking station 90 (FIG. 9) for securing one or more stacked cargo pods 30 to the ground. The docking station may include a dock top surface 32 for capturing the pod bottom surface 33 or the UAVs bottom surface 22. The dock top surface 32 may be configured to conform to the pyramidal top surface 32 of the cargo pod 30.

Figure 9:
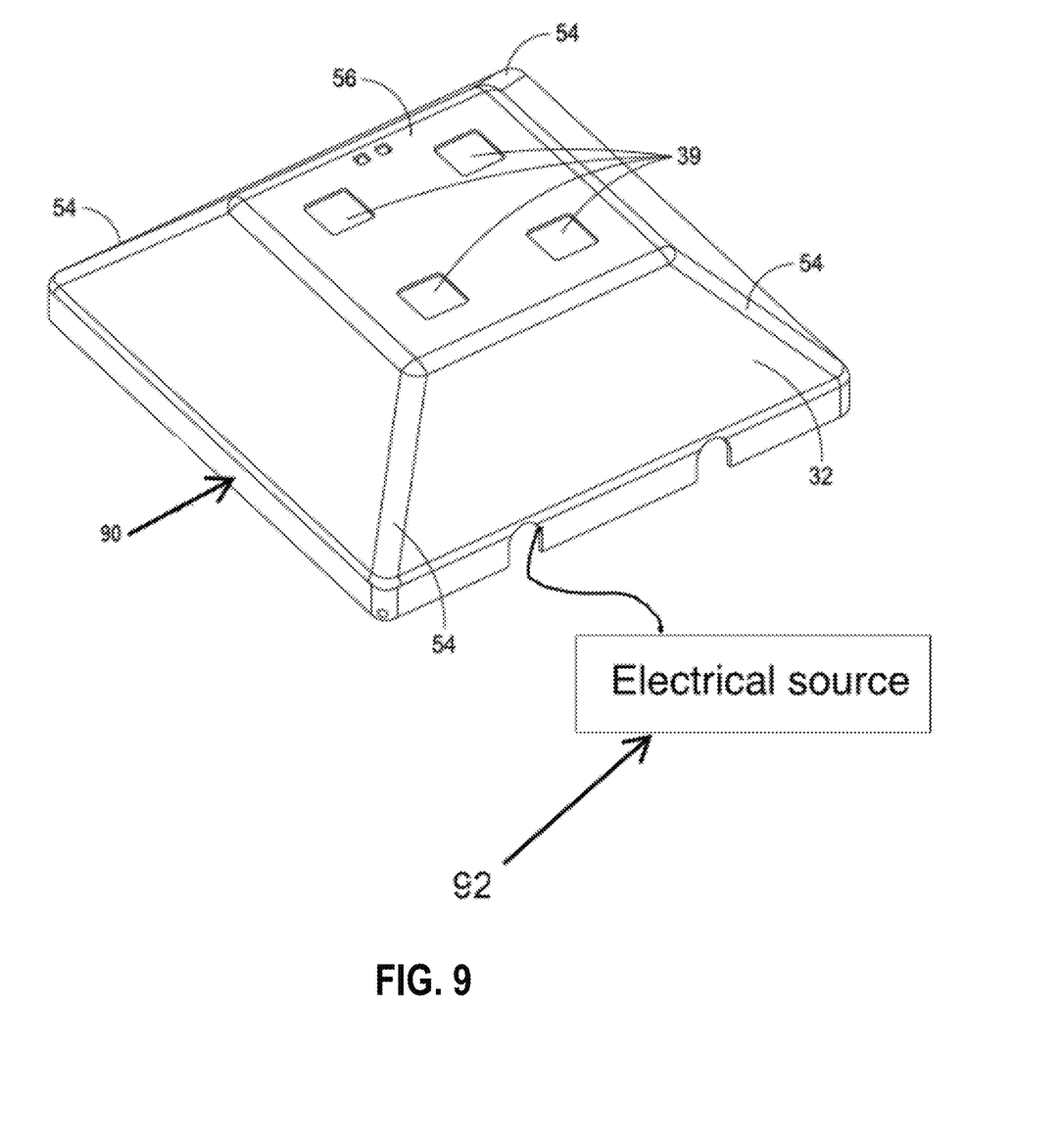
FIG. 9 illustrates another embodiment of the pyramidal top surface of a docking station.

Continuing, the docking station may also be configured with electrical power 92 and a power transfer means for routing the electrical power to the one or more stacked cargo pods for charging the main battery or charging the auxiliary batteries 38 of the stacked pods. The power transfer means may include one or more power transfer contacts 39 on the dock top surface for sending the electrical power to the stacked pods 30 or the UAV 20. The electrical power may be provided by an auxiliary battery of the docking station or by a land-based electrical grid.

The one or more steering components of the UAV 20 may be configured for approaching the docking station to within the steering accuracy of the UAV 20. The UAV 20 may be configured to steer downward until the base perimeter 24 of the lowest of the one or more stacked cargo pods 30 slidably contacts the dock top surface for gravity-aligning the cargo pods 30 in azimuth and laterally, where a capture radius 25 of the base perimeter 24 is greater than a lateral component of the steering accuracy.

The bottom surface of the cargo pod may be equipped with the complementary power transfer contacts for transferring power from the power transfer contacts on the docking station or another cargo pod. Alternatively, the docking station may employ induction charging for transferring power to the cargo pod or UAV captured above it and without using exposed metal contacts. Beneficially, the described pyramidal surfaces 22 and 32, latching systems, and power transfer contacts 39 may provide a docking system 10 that enables the autonomous retrieval of one or more cargo pods 30, the field charging of pod 30 and UAV 20, and the secure parking of payloads 14 at ground stations.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. An autonomous docking system for unmanned aerial delivery of a payload from a ground station, the docking system comprising:
   an unmanned aerial vehicle (UAV) having one or more motors for powered flight and a pyramidal bottom surface opening downward terminating into a base perimeter;
   a cargo pod configured to carry the payload from the ground station and having a pyramidal top surface complementary to the pyramidal bottom surface of the UAV;
   a latching system for locking the UAV to the cargo pod when docked, wherein the latching system comprises magnetic latches and complementary latch receptacles on the cargo pod;
   one or more steering components disposed on the UAV for approaching the cargo pod at the ground station to within a steering accuracy; and
   where the UAV is configured to dock by steering downward until the base perimeter slidably contacts the pyramidal top surface of the cargo pod for gravity- aligning the UAV in azimuth and laterally, where a capture diagonal dimension of the base perimeter is greater than a lateral component of the steering accuracy;
   a docking station providing the ground station; and
   wherein:
   the cargo pod includes a pod bottom surface forming a pyramidal bottom surface opening downward and the pod bottom surface includes a latching system,
the pod bottom surface and the latching system being configured for capturing the ground station, and
the docking station providing the ground station having a pyramidal top surface for gravity-aligning to the cargo pod.

2. The docking system of claim 1, wherein:
the steering components are one or more of LIDAR, GPS, infrared, inertial, and photographic components.

3. The docking system of claim 1, wherein:
the bottom and the top pyramidal surfaces each have 4 sides and the steering accuracy includes an azimuthal component of less than 45 degrees of error.

4. The docking system of claim 1, further comprising:
a mating rack in selective attachment to the UAV, and wherein the mating rack is configured for providing attachment between a portion of the UAV having one or more motors and the pyramidal bottom surface.

5. The docking system of claim 4, wherein:
the rack includes one or more of electro-mechanical latches or the magnetic latches of the latching system.

6. The docking system of claim 1, further comprising:
a main battery on the UAV for powering the one or more motors, an auxiliary battery on the cargo pod, and one or more power transfer contacts on the pyramidal top surface for sending power from the auxiliary battery to the UAV while docked.

7. The docking system of claim 1, further comprising:
a docking sensor to indicate correct alignment and mating with the pod, the sensor configurable to enable the latching system.

8. The docking system of claim 1, further comprising:
a cargo bay inside the cargo pod for housing the payload.

9. The docking system of claim 8, further comprising:
an access door on the cargo pod configurable for locking the cargo bay and discouraging theft.

10. The docking system of claim 1, wherein:
the docking station providing the ground station is one or more of another cargo pod, a parking location for customer delivery, and a docking station for powering or recharging the UAV.

11. An autonomous docking system including an unmanned aerial vehicle (UAV), the autonomous docking system for securely storing a payload deliverable by the unmanned aerial vehicle (UAV), the UAV having a battery for powered flight, the docking system comprising: p1 a cargo pod for carrying the payload deliverable by the UAV and hoistable by the UAV, the cargo pod having a pyramidal bottom surface opening downward terminating into a base perimeter;
a docking station securable to a ground location and having a pyramidal top surface complementary to the pyramidal bottom surface of the cargo pod;
a latching system for locking the cargo pod to the docking station, wherein the latching system comprises one or more of electro-permanent magnetic (EPM) devices disposed on the cargo pod and complementary latch receptacles disposed on the docking station;
the UAV, and one or more steering components on the UAV for approaching the docking station to within a steering accuracy; and
wherein the cargo pod hoistable by the UAV is configured to dock by steering the UAV downward until the base perimeter of the cargo pod slidably contacts the pyramidal top surface of the docking station for gravity-aligning the cargo pod in azimuth and laterally, where a capture diagonal dimension of the base perimeter is greater than a lateral component of the steering accuracy.

12. The docking system of claim 11, wherein:
the docking station is configured to provide electrical power and configuring the docking system comprises a power transfer means for routing the electrical power to the cargo pod for powering the UAV or recharge the battery.

13. The docking system of claim 12, wherein:
the electrical power is configured to be provided to the docking station from one or more of an auxiliary battery in electrical connection with the docking station and an electrical connection configured to connect to a land-based electrical grid in electrical connection with the docking station, and
wherein the power transfer means includes one or more power transfer contacts on the pyramidal top surface of the docking station.

14. The docking system of claim 11, wherein:
the docking station is a second cargo pod for stacking and locking the cargo pod, and
each of the cargo pod and the second cargo pod are configured to selectively connect with the UAV, each of the cargo pod and the second cargo pod are configured to selectively connect with one another, and each of the cargo pod and the second cargo pod are configured to carry the payload from the ground station.

15. The docking system of claim 11, wherein:
the bottom and the top pyramidal surfaces each have 4 sides and the steering accuracy includes an azimuthal component of less than 45 degrees of error.

16. An autonomous docking system for unmanned aerial delivery of a payload from a ground station, the docking system comprising:
an unmanned aerial vehicle (UAV) having one or more motors for powered flight and a pyramidal bottom surface opening downward terminating into a base perimeter;
a first cargo pod and a second cargo pod, wherein:
each of the first cargo pod and the second cargo pod are configured to selectively connect with the UAV,
each of the first cargo pod and the second cargo pod are configured to selectively connect with one another,
each of the first cargo pod and the second cargo pod are configured to carry the payload from the ground station,
each of the first cargo pod and the second cargo pod have a top cargo pod surface and a bottom cargo pod surface,
at least one of the first cargo pod and the second cargo pod have a pyramidal top surface complementary to the pyramidal bottom surface of the UAV, and the bottom cargo pod surface having a pyramidal bottom surface conforming to the pyramidal top surface of the other one of the at least one of the first cargo pod and the second cargo pod;
a latching system for locking the UAV to the cargo pod when docked, wherein the latching system comprises latches and complementary latch receptacles on at least one of the first cargo pod and the second cargo pod;
one or more steering components disposed on the UAV for approaching at least one of the first cargo pod and the second cargo pod at the ground station to within a steering accuracy; and
wherein the UAV is configured to dock by steering downward until the base perimeter slidably contacts the pyramidal top surface of the at least one of the first cargo pod and the second cargo pod for gravity-aligning the UAV in azimuth and laterally, where a capture diagonal dimension of the base perimeter is greater than a lateral component of the steering accuracy.

* * * * *